(12) United States Patent
Liu et al.

(10) Patent No.: US 10,833,320 B2
(45) Date of Patent: Nov. 10, 2020

(54) POLY(9,9-DIOCTYLFLUORENE-CO-FLUORENONE-CO-METHYLBENZOIC ESTER), CARBON NANOTUBES, AND SULFUR NANOCOMPOSITE, ELECTRODE AND LITHIUM-FULFUR BATTERY INCLUDING THE SAME

(71) Applicants: Gao Liu, Piedmont, CA (US); Guo Ai, Guangzho (CN); Hui Zhao, Emeryville, CA (US)

(72) Inventors: Gao Liu, Piedmont, CA (US); Guo Ai, Guangzho (CN); Hui Zhao, Emeryville, CA (US)

(73) Assignee: The Regents of the University of California, Oakland, CA (US)

( * ) Notice: Subject to any disclaimer, the term of this patent is extended or adjusted under 35 U.S.C. 154(b) by 2 days.

(21) Appl. No.: 16/043,051

(22) Filed: Jul. 23, 2018

(65) Prior Publication Data
US 2019/0074507 A1  Mar. 7, 2019

Related U.S. Application Data

(63) Continuation of application No. PCT/US2017/014388, filed on Jan. 20, 2017.
(Continued)

(51) Int. Cl.
*H01M 4/36* (2006.01)
*H01M 10/052* (2010.01)
(Continued)

(52) U.S. Cl.
CPC ........... *H01M 4/364* (2013.01); *H01M 4/136* (2013.01); *H01M 4/366* (2013.01);
(Continued)

(58) Field of Classification Search
CPC ...... H01M 4/364; H01M 4/136; H01M 4/366; H01M 4/5815; H01M 4/606; H01M 4/623; H01M 4/625; H01M 4/661
(Continued)

(56) References Cited

U.S. PATENT DOCUMENTS

2014/0141328 A1  5/2014  Dai et al.
2015/0311504 A1  10/2015  Hong et al.
(Continued)

OTHER PUBLICATIONS

Wang et al., A Conductive Polypyrrole-Coated, Sulfur-Carbon Nanotube Composite for Use in Lithium-Sulfur Batteries, Feb. 2013, ChemPlusChem, 78, 318-324 (Year: 2013).*
(Continued)

*Primary Examiner* — Sean P Cullen
(74) *Attorney, Agent, or Firm* — Robin C. Chiang; Lawrence Berkeley National Laboratory

(57) ABSTRACT

The present invention provides for a composition of matter comprising: poly(9,9-dioctylfluorene-co-fluorenone-co-methylbenzoic ester)(PFM), carbon nanotubes (CNT), and sulfur particles nanocomposite, wherein the nanocomposite is porous. The present invention also provides for an electrode comprising: poly(9,9-dioctylfluorene-co-fluorenone-co-methylbenzoic ester)(PFM), carbon nanotubes (CNT), and sulfur particles nanocomposite, wherein the nanocomposite is porous. The present invention also provides for a lithium sulfur (Li—S) battery comprising: an electrode comprising poly(9,9-dioctylfluorene-co-fluorenone-co-methylbenzoic ester)(PFM), carbon nanotubes (CNT), and sulfur particles nanocomposite, wherein the nanocomposite is porous.

7 Claims, 13 Drawing Sheets

Related U.S. Application Data

(60) Provisional application No. 62/286,238, filed on Jan. 22, 2016.

(51) Int. Cl.
*H01M 4/58* (2010.01)
*H01M 4/66* (2006.01)
*H01M 4/62* (2006.01)
*H01M 4/136* (2010.01)
*H01M 4/60* (2006.01)
*H01M 2/16* (2006.01)
*H01M 4/02* (2006.01)

(52) U.S. Cl.
CPC ......... *H01M 4/5815* (2013.01); *H01M 4/606* (2013.01); *H01M 4/623* (2013.01); *H01M 4/625* (2013.01); *H01M 4/661* (2013.01); *H01M 10/052* (2013.01); *H01M 2/1653* (2013.01); *H01M 2004/021* (2013.01)

(58) Field of Classification Search
USPC ........................................ 429/213, 217, 232
See application file for complete search history.

(56) References Cited

U.S. PATENT DOCUMENTS

| | | |
|---|---|---|
| 2015/0318532 A1 | 11/2015 | Manthiram et al. |
| 2015/0325850 A1 | 11/2015 | Jang et al. |

OTHER PUBLICATIONS

Li et al., Sulfur supported by carbon nanotubes and coated with polyaniline: Preparation and performance as cathode of lithium-sulfur cell, Mar. 2015, Electrochimica Acta, 166, 93-99 (Year: 2015).*

Li et al., Sulfur encapsulated in porous carbon nanospheres and coated with conductive polyaniline as cathode of lithium-sulfur battery, Aug. 2015, Journal of Solid State Electrochemistry, 20, 153-161 (Year: 2015).*

Zhou et al., Core@shell sulfur@polypyrrole nanoparticles sandwiched in graphene sheets as cathode for lithium-sulfur batteries, Aug. 2015, Journal of Energy Chemistry, 24, 448-455 (Year: 2015).*

Wu et al., Improvement of Rate and Cycle Performance by Rapid Polyaniline Coating of a MWCNT/Sulfur Cathode, Oct. 2011, Journal of Physical Chemistry C, 115, 24411-24417 (Year: 2011).*

Liu et al., Polymers with Tailored Electronic Structure for High Capacity Lithium Battery Electrodes, Sep. 2011, Advanced Materials, 23, 4679-4683 (Year: 2011).*

Ai et al., Biomimetic Ant-Nest Electrode Structures for High Sulfur Ratio Lithium-Sulfur Batteries, Aug. 2016, Nano Letters, 16, 5365-5372 (Year: 2016).*

Cho et al., "Commercial and research battery technologies for electrical energy storage applications." Progress in Energy and Combustion Science, 2015. 48: p. 84-101 (2015).

Tarascon et al., "Issues and challenges facing rechargeable lithium batteries." Nature, 414 (6861): p. 359-367 (2001).

Wu et al., "Rational Design of Anode Materials Based on Group IVA Elements (Si, Ge, and Sn) for Lithium-Ion Batteries." Chemistry—An Asian Journal, 8(9): p. 1948-1958 (2013).

Ji et al., "Recent developments in nanostructured anode materials for rechargeable lithium-ion batteries." Energy & Environmental Science, 4(8): p. 2682-2699 (2011).

Wagner et al., "Electrochemistry and the Future of the Automobile." The Journal of Physical Chemistry Letters, 1(14): p. 2204-2219 (2010).

Barghamadi et al., "A Review on Li—S Batteries as a High Efficiency Rechargeable Lithium Battery." Journal of the Electrochemical Society, 160(8): p. A1256-A1263 (2013).

Bresser et al., "Recent progress and remaining challenges in sulfur-based lithium secondary batteries—a review." Chemical Communications, 49(90): p. 10545 (2013).

Bruce et al., "Li—O2 and Li—S batteries with high energy storage." Nature Materials, 11(1): p. 19-29 (2011).

Chen et al., "Recent advances in lithium-sulfur batteries." Journal of Power Sources, 267: p. 770-783 (2014).

Evers et al., "Understanding the Nature of Absorption/Adsorption in Nanoporous Polysulfide Sorbents for the Li—S Battery." The Journal of Physical Chemistry C, 116(37): p. 19653-19658 (2012).

Song et al., "Strong Lithium Polysulfide Chemisorption on Electroactive Sites of Nitrogen-Doped Carbon Composites for High-Performance Lithium-Sulfur Battery Cathodes." Angewandte Chemie International Edition, p. n/a-n/a (2015).

Mikhaylik et al., "Polysulfide Shuttle Study in the Li/S Battery System." Journal of the Electrochemical Society, 151(11): p. A1969 (2004).

Chen et al., "Ultrafine Sulfur Nanoparticles in Conducting Polymer Shell as Cathode Materials for High Performance Lithium/Sulfur Batteries." Scientific Reports, 3 (2013).

Wei et al., "Sulphur-TiO2 yolk-shell nanoarchitecture with internal void space for long-cycle lithium-sulphur batteries." Nature Communications, 4: p. 1331 (2013).

Yao et al., "Improving lithium—sulphur batteries through spatial control of sulphur species deposition on a hybrid electrode surface." Nature Communications, 5 (2014).

Song et al., "Nitrogen-Doped Mesoporous Carbon Promoted Chemical Adsorption of Sulfur and Fabrication of High-Areal-Capacity Sulfur Cathode with Exceptional Cycling Stability for Lithium-Sulfur Batteries." Advanced Functional Materials, 24(9): p. 1243-1250 (2014).

Pang et al., "Surface-enhanced redox chemistry of polysulphides on a metallic and polar host for lithium-sulphur batteries." Nature Communications,. 5: p. 4759 (2014).

Seh et al., "Stable cycling of lithium sulfide cathodes through strong affinity with a bifunctional binder." Chemical Science, 4(9): p. 3673 (2013).

Ai et al., "Investigation of surface effects through the application of the functional binders in lithium sulfur batteries." Nano Energy, 16(0): p. 28-37 (2015).

Gordin et al., "Bis(2,2,2-trifluoroethyl) Ether as an Electrolyte Co-solvent for Mitigating Self-Discharge in Lithium-Sulfur Batteries." ACS Applied Materials & Interfaces, 6(11): p. 8006-8010 (2014).

Scheers et al., "A review of electrolytes for lithium-sulphur batteries." Journal of Power Sources, 255(0): p. 204-218 (2014).

Yang et al., "Nanostructured sulfur cathodes." Chemical Society Reviews, 42(7): p. 3018 (2013).

Lv et al., "High Energy Density Lithium-Sulfur Batteries: Challenges of Thick Sulfur Cathodes." Advanced Energy Materials, p. n/a-n/a (2015).

Yang et al., "High-Capacity Micrometer-Sized Li2S Particles as Cathode Materials for Advanced Rechargeable Lithium-Ion Batteries." Journal of the American Chemical Society, 134(37): p. 15387-15394 (2012).

Barchasz et al., "Novel positive electrode architecture for rechargeable lithium/sulfur batteries." Journal of Power Sources, 211(0): p. 19-26 (2012).

Cheon et al., "Rechargeable Lithium Sulfur Battery: II. Rate Capability and Cycle Characteristics." Journal of the Electrochemical Society, 150(6): p. A800-A805 (2003).

Latty et al., "Structure and formation of ant transportation networks." Journal of the Royal Society Interface, 8(62): p. 1298-1306 (2011).

Zhou et al., "A graphene foam electrode with high sulfur loading for flexible and high energy Li—S batteries." Nano Energy, 11: p. 356-365 (2015).

Patent Cooperation Treaty, PCT/US2017/014388 "PCT Notification of Transmittal of the International Search Report and the Written Opinion of the International Searching Authority, or the Declaration." ISA, including Forms PCT/ISA/220, 210, and 237 (2017).

(56) References Cited

OTHER PUBLICATIONS

Wang et al., "Improve Rate Capability of the Sulfur Cathode Using a Gelatin Binder." Journal of the Electrochemical Society, 158(6): p. A775-A779 (2011).

* cited by examiner

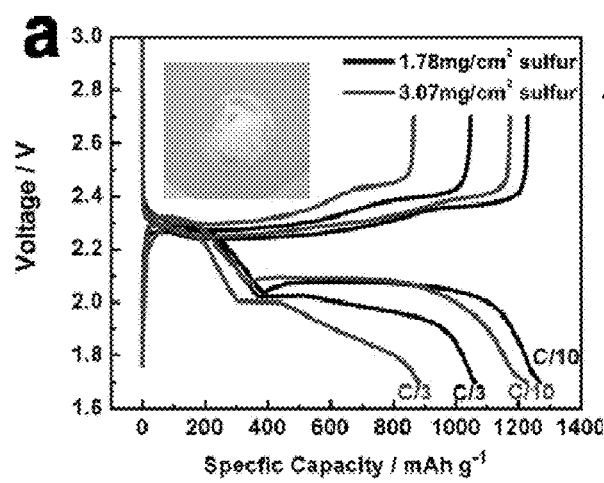
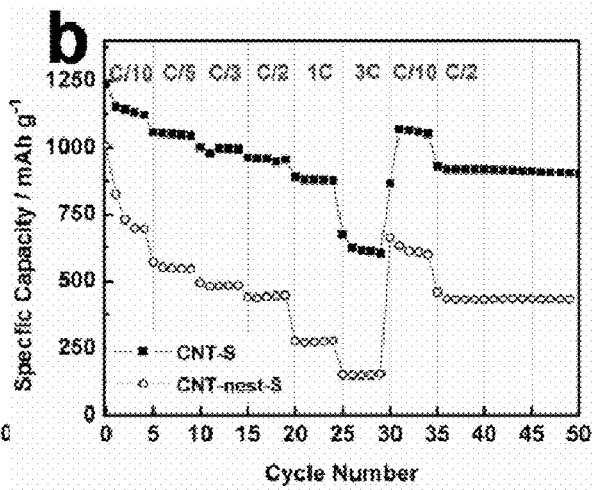
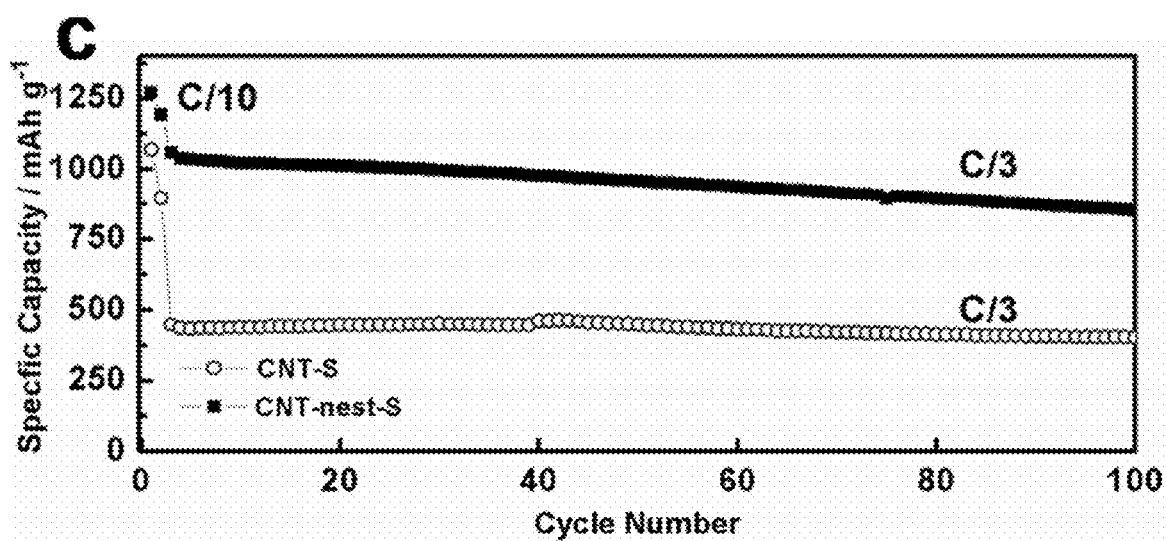
FIG. 3C

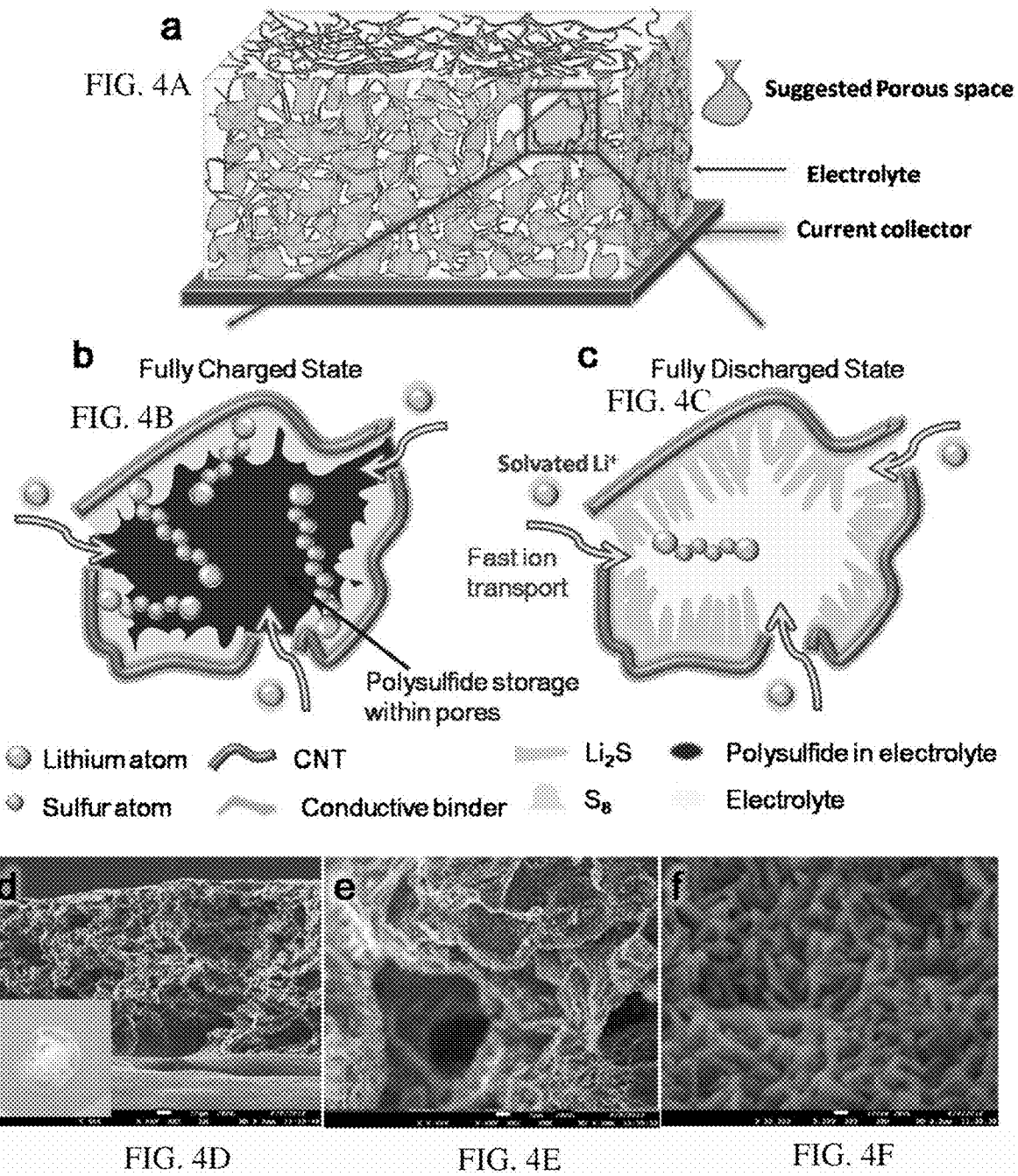

POLY(9,9-DIOCTYLFLUORENE-CO-FLUORENONE-CO-METHYLBENZOIC ESTER), CARBON NANOTUBES, AND SULFUR NANOCOMPOSITE, ELECTRODE AND LITHIUM-FULFUR BATTERY INCLUDING THE SAME

CROSS REFERENCE TO RELATED APPLICATIONS

This application claims priority as a continuation application of PCT International Patent Application No. PCT/US17/14388, filed Jan. 20, 2017, which claims priority to U.S. Provisional Application Ser. No. 62/286,238, filed Jan. 22, 2016, both of which are incorporated herein by reference as if fully set forth in their entireties.

STATEMENT OF GOVERNMENTAL SUPPORT

The invention was made with government support under Contract No. DE-AC02-05CH11231 awarded by the U.S. Department of Energy. The government has certain rights in the invention.

BACKGROUND OF THE INVENTION

Field of the Invention

The present invention relates to the field of Lithium-sulfur (Li—S) batteries.

Related Art

High energy density and low cost rechargeable batteries are attracting great interest because of the increasing demand by portable device, electric vehicle and stationary energy storage system. The Lithium-sulfur (Li—S) battery is one of the most promising candidates because of its high energy density (2600 Wh $kg^{-1}$), environmental friendliness, and low cost due to the earth abundant resource of elemental sulfur. However, the application of Li—S batteries has been hindered by several shortcomings, including the poor cycling stability, low coulombic efficiency, etc. These shortcomings mainly stem from the dissolution of polysulfide in the electrolyte as intermediate species during both charge and discharge process. The polysulfide species can diffuse to and react with Li-metal electrode, usually referred to as a shuttle effect, resulting in active material loss and self-discharge. Efforts have been made to address this issue, which include encapsulating the polysulfide with well-designed structure, attracting polysulfide through functional groups with strong affinity, and eliminating polysulfide dissolution, as well as anode protection with modification of the electrolyte.

Another issue that limits the Li—S batteries performance is the poor electrical conductivity of reaction products ($S_8$ in the charged state and $Li_2S$ in the discharged state) during cycling, which are a big obstacle in the high utilization of active material. In most of the recent research work, a high weight ratio (40%) of carbon additive is incorporated in the electrode and a complicated design of conductive additive has to be performed. Therefore, the practical energy density of Li—S batteries will suffer. It is clear that Li—S batteries are facing an urgent need toward high efficient Li—S electrode design to achieve high practical energy density, good cycling performance while minimizing the composition of inactive component (e.g. conductive additive, binder, current collector, etc.).

In order to achieve the application goal, the research toward high loading Li—S batteries is urgent and intriguing to all researchers. It has become one of the main focuses in Li—S battery research today. However, in the effort to push the Li—S batteries to high energy density, especially for high power application (e.g. high current output), other issues will arise. The most predominant issue among them is the blocking of ion transportation channels and the resultant poor sulfur utilization. In current high loading Li—S batteries, due to the presence of the significant amount, high resistance and the fast precipitation of the $S_8/Li_2S$ at the electrode/electrolyte interface, the ion transportation channels in electrodes are very liable to be blocked (see FIG. 1A).

FIG. 1A illustrates the cycling performance and FIG. 1B illustrates the voltage profile at C/10 and C/3 of the carbon nanotube (CNT)-sulfur cells with 1.78 $mgcm^{-2}$ and 3.17 mg $cm^{-2}$ sulfur loading. The SEM top morphology of the fully-discharged CNT-S with 3.17 $mgcm^{-2}$ sulfur loading is shown in inset of FIG. 1A, and photo image of the separator is shown in FIG. 1B.

Another critical problem for the high loading Li—S batteries is that mechanical problems will arise when the electrode thickness further increases the loading. Cracks and delamination are very likely to appear in the electrode if the binder cannot handle the inner stress. Also, more polysulfide dissolution and much more severe shuttle effect will exist in high loading Li—S batteries compared to the low loading ones and greater need for the lithium protection.

Therefore, in order to achieve high efficient high loading Li—S battery, several properties of the Li—S design need to be addressed. Firstly, enough valid channels to facilitate fast Li-ion and polysulfide transportation. Secondly, the large and high conductive surface area for polysulfide reaction and $S_8/Li_2S$ precipitation. Thirdly, the ability of electrode to sustain and mitigate polysulfide diffusion into the electrolyte.

Fast ion transport capability is the most crucial factor for high loading Li—S batteries. However, in most cases the transport is not sufficient due to the limited reaction surface and liable blocking of the transport channels, especially in the case of high rate requirement. This will lead to low cycling capacity and poor sulfur utilization, which is a common issue in other research work.

BRIEF DESCRIPTION OF THE DRAWINGS

The foregoing aspects and others will be readily appreciated by the skilled artisan from the following description of illustrative embodiments when read in conjunction with the accompanying drawings.

FIG. 3A illustrates the voltage profiles for the 1.78 mgcm$^{-2}$ and 3.07 mgcm$^{-2}$ CNT-nest-S cell at C/10 and C/3.

FIG. 3B shows the comparison of rate performance between CNT-S and CNT-nest-S cell, with sulfur loading 1.78 mgcm$^{-2}$.

FIG. 3C shows the cycling performance between CNT-S and CNT-nest-S cell.

FIG. 4A illustrates a schematic diagram of CNT-nest-S electrode structure.

FIG. 4B shows local magnification diagram illustrating the working mechanism of the nest structure in fully charged state.

FIG. 4C shows the discharge state.

FIG. 4D is a photo of the separator in CNT-nest-S cell.

FIG. 4E shows a SEM image of the cross-section morphology of discharged CNT-nest-S electrode with 3 mgcm$^{-2}$ sulfur loading.

FIG. 4F shows another SEM image.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Figure 1A:
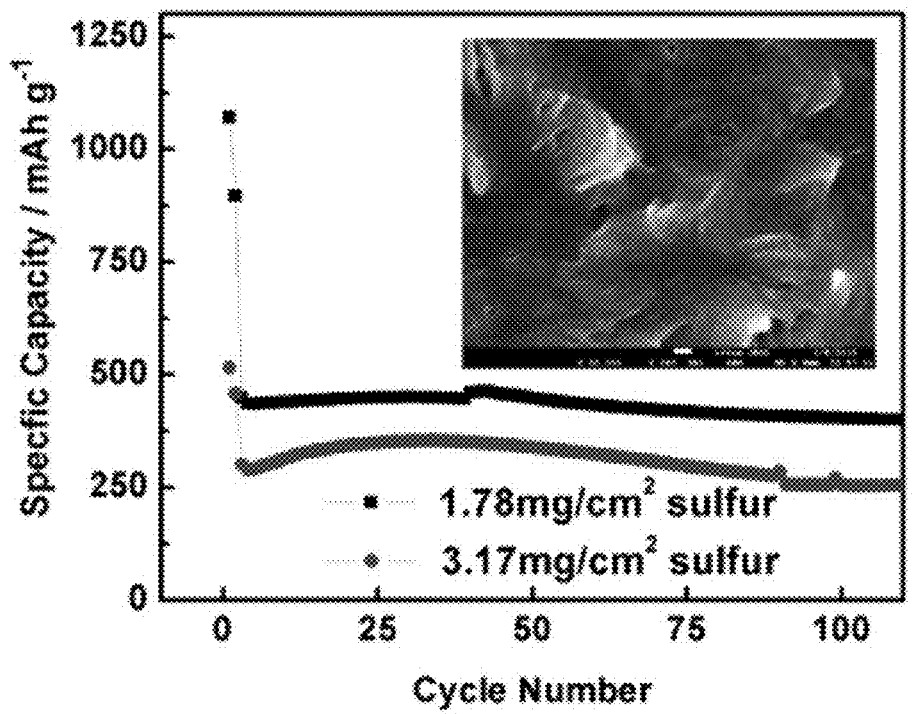
FIG. 1A illustrates the cycling performance of CNT-S cells.
Figure 1B:
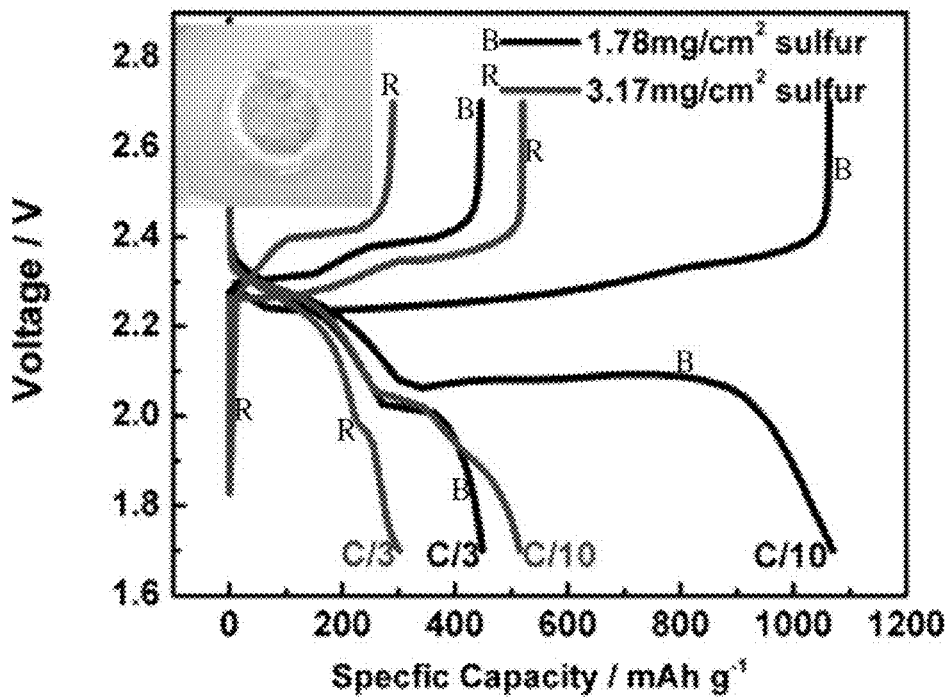
FIG. 1B illustrates the voltage profile at C/10 and C/3 of the CNT-S cells with 1.78 $mgcm^{-2}$ and 3.17 mg $cm^{-2}$ sulfur loading. The SEM top morphology of the fully-discharged CNT-S with 3.17 $mgcm^{-2}$ sulfur loading is shown in inset of FIG. 1A, and photo image of the separator is shown in FIG. 1B.
Figure 6A:
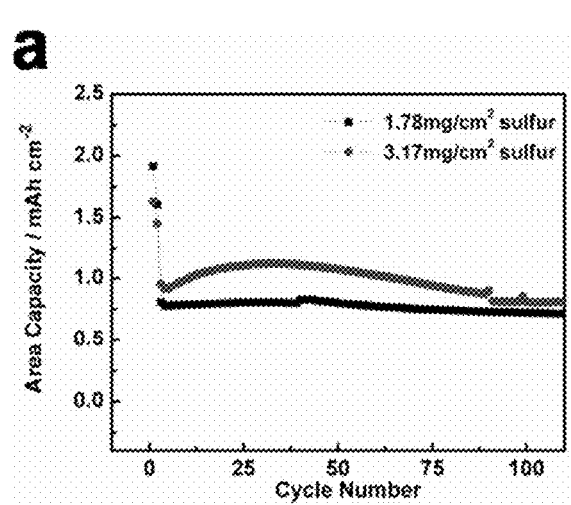
FIG. 6A illustrates area capacity of the cycling performance of the CNT-S cells with 1.78 mgcm$^{-2}$ and 3.17 mg cm$^{-2}$ sulfur loading.
Figure 7:
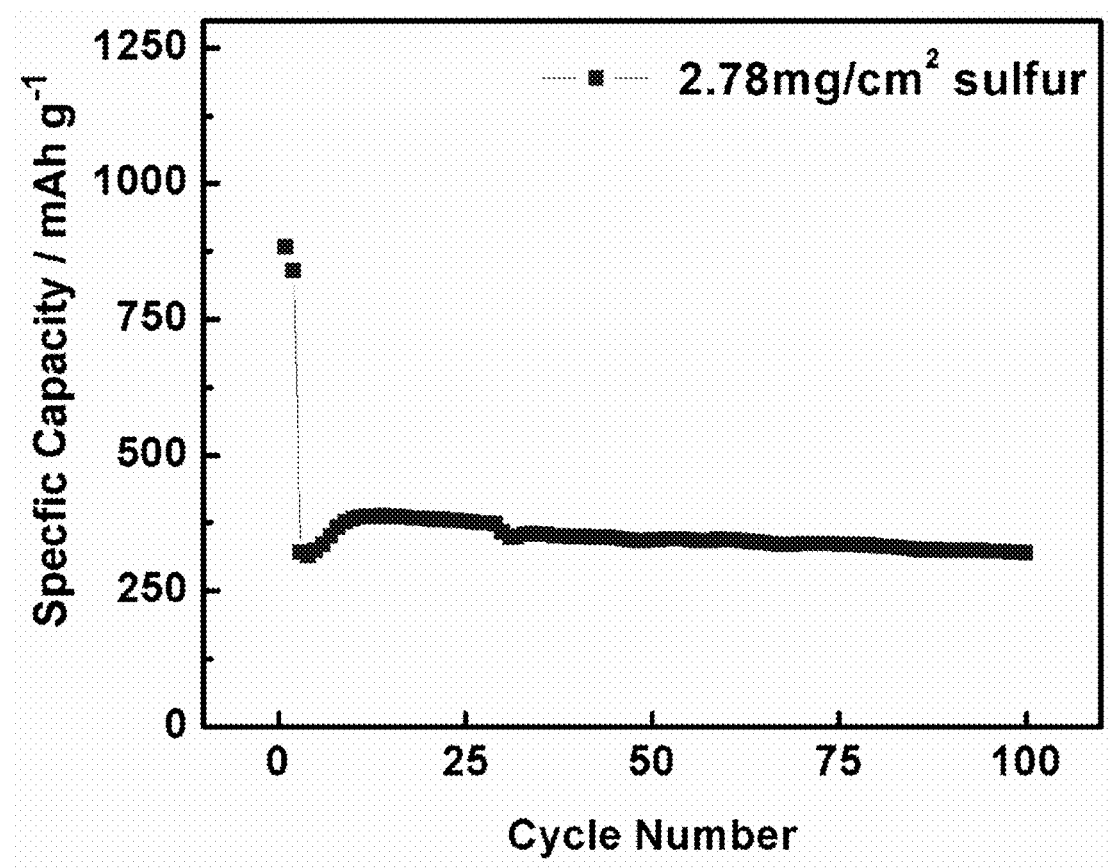
FIG. 7 illustrates specific capacity of the cycling performance of the Li—S cells with AB conductive additive and 2.78 mgcm$^{-2}$ sulfur loading.

In this work, the phenomena is demonstrated via two Li—S battery systems, with carbon nanotube (CNT) and acetylene black (AB) as conductive additives, respectively. For Li—S cells with CNT additive, hereafter referred to as CNT-S, two different sulfur loadings of 1.78 mgcm$^{-2}$ and 3.17 mgcm$^{-2}$ are tested, see FIGS. 1A-1B. A low sulfur utilization is observed for both cells, especially at C/3 and higher loading, and the area capacity for two cells are very similar, being below 1 mAhcm$^{-2}$, in FIG. 6A. The cause of this issue can be analyzed via the voltage profile, see FIG. 1B. For the 1.78 mgcm$^{-2}$ CNT-S cell, almost the same capacity is obtained from the upper voltage plateau both at C/10 and C/3, which corresponds to the long chain polysulfide dissolution (from $S_8$ to $Li_2S_4$), but the capacity obtained from the lower voltage plateau shows huge difference between C/10 and C/3. Only 200 mAhg$^{-1}$ capacity can be obtained at C/3 in the lower voltage plateau, which is one fourth of the 800 mAhg$^{-1}$ obtained at C/10. This indicates that insufficient sulfur precipitation (from $Li_2S_4$ to $Li_2S$) exists in the second discharge plateau. This issue is more severe in Li—S electrode with 3.17 mg cm$^{-2}$ sulfur loading, in which both of the lower plateaus is severely reduced at C/10 and C/3. This phenomenon indicates that the bottleneck is the limited reaction surface, which resulted in insufficient $Li_2S$ precipitation. This is also observed in different Li—S cells with AB additive, see FIG. 7.

Figure 6B:
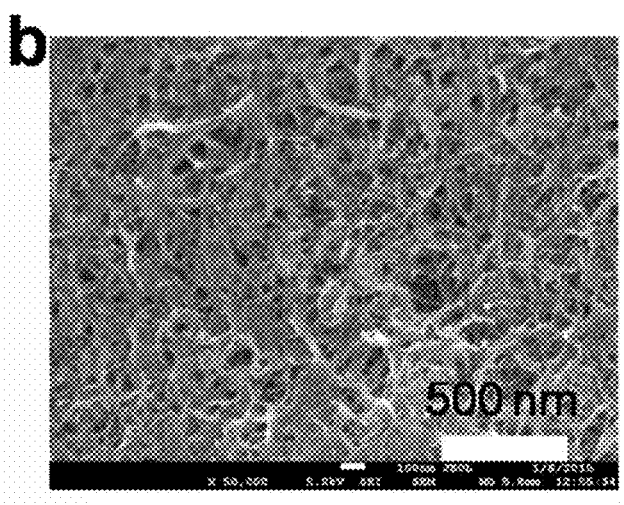
FIG. 6B illustrates the SEM top morphology of the fully-discharged CNT-S SEM images.

The main cause of this insufficient $Li_2S$ precipitation is the blocking of the ion transport channel, which can be further elucidated via post mortem analysis. A thick layer of $Li_2S$ precipitation is observed on the ~3 mgcm$^{-2}$ electrode after fully discharge at C/3, inset of FIG. 1A, but the internal pores are still empty, see FIG. 6B. When the current density is high, the precipitation of sulfur species ($Li_2S_x$, x=1-2) which has a poor solubility and is highly insulating, is very likely to precipitate on the electrode surface next to separator, and block the small channels on the electrode surface. The electrode surface area is too small for $Li_2S$ precipitation. The thick $Li_2S$ layer will lead to the severe passivation of the electrode and early end of discharge, FIG. 1A. A large quantity of polysulfide will be blocked out and remain in the electrolyte, inset of FIG. 1B, which leads to the poor cycling capacity. Therefore, sufficient reaction inner surface area and straightway ion transport channel is the primary factor for high loading CNT-S cells. Once the surface pores and channels are blocked, no more charge/discharge can take place even with further increase the sulfur loading. This is the bottleneck in further attempts to achieve high loading for Li—S batteries and will be overcome by the ant-nest structure proposed in this work.

Herein, we integrate all the design criteria into this novel and high efficient electrode structure for Li—S batteries, which is inspired by the nature super-efficient ant nest structure. The structure of ant nest network is famous for the smart special design with abundant storage space and interconnected multiple channel between storage sites which can provide the shortest possible way for fast material transportation. The ant nest electrode is designed with the most cheap, industrialized ball milling method and feasible sacrificial method. The world's best conductive agent, multi-wall carbon nanotube (CNT) framework is selected for the conductive additive, which has high carrier mobility of above 10000 cm$^2$Vs$^{-1}$, and enables ultra fast electron transportation. Also, it is light, cheap and processes extra large surface area. House-hold salt (sodium chloride, NaCl) is selected as the sacrificial additive, which is cheap, abundant, and environmental friendly. After removing the NaCl microparticles from the composite electrode by simple water washing, perfect ant-nest structure can be formed with multi interconnected channels for ultra fast Li-ion transport and micro porous structure for sufficient polysulfide storage, see FIG. 2A. The porous morphology of the ant nest electrode structure can be observed on the electrode cross-section and surface, see FIGS. 2B-2D. The open pores can be effective in enlarging the surface reaction area. Also, the ion transport channels are less likely to be blocked since the porous are interconnected through the multi channels all through the electrode.

Figure 2A:
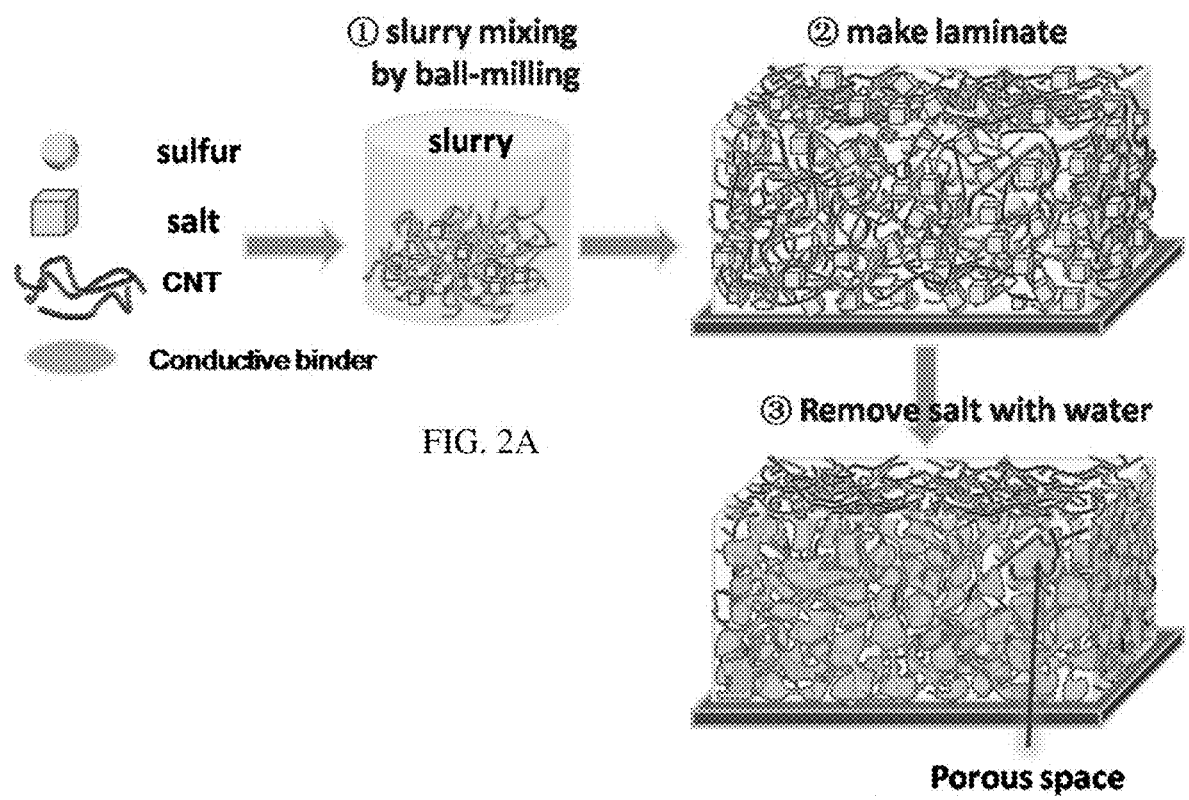
FIG. 2A illustrates a schematic illustration of the porous ant-nest structure Li—S electrode (CNT-nest-S) fabrication procedure.
Figure 2B:
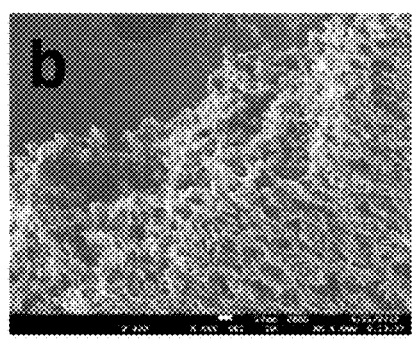
FIG. 2B illustrates SEM cross-section of CNT-nest-S.
Figure 2C:
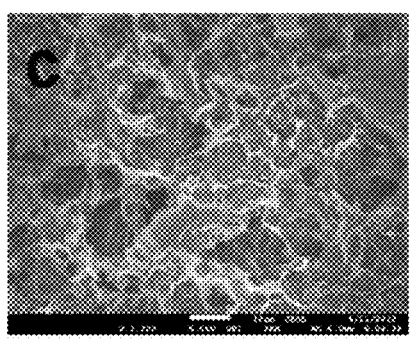
FIG. 2C illustrates top morphology of CNT-nest-S.
Figure 2D:
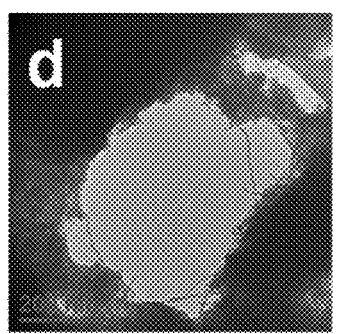
FIG. 2D illustrates the TEM morphology of the pore in the fully discharged CNT-nest-S.

FIG. 2A illustrates a schematic illustration of the porous ant-nest structure Li—S electrode (CNT-nest-S) fabrication procedure. FIG. 2B illustrates SEM cross-section, and FIG. 2C illustrates top morphology of CNT-nest-S. FIG. 2D illustrates the TEM morphology of the pore in the fully discharged CNT-nest-S.

The property of this structure highly suites all the requirements for high loading Li—S batteries with the following characteristics: (1) the nest structure possess large storage ability for efficient polysulfide sustain as well as accommodate sulfur volume change; (2) the interconnected channels between storage sites enable fast ion and polysulfide transport, and prohibit channel blocking with efficient pathway; (3) the maximized inner surface by the nest structure and the CNT facilitate efficient surface reaction for the transition among different sulfur species; (4) the functionalized conductive binder can help to further sustain the polysulfide inside storage pores with strong affinity between functional binder and the polysulfide; (5) the conductive binder assists the interconnecting CNT framework to provide the super conductivity of the Li—S electrode. With the structure design, the ant-nest electrode shows good performance at high sulfur loading up to 3 mgcm$^{-2}$ with 50 wt % sulfur ratio (to the electrode). Moreover, it possesses the potential to increase sulfur composition up to 85 wt %, with only 12 wt % CNT and 3 wt % binder, which can improve the practical energy density significantly. Also, the cost effective and facile fabrication method, with house hold salt and water as the only processing ingredients should be addressed. In all, the high efficiency of this ant nest electrode has been well demonstrated and it is highly preferable in achieving the practical application of Li—S batteries.

FIG. 3A illustrates the voltage profiles for the 1.78 mgcm$^{-2}$ and 3.07 mgcm$^{-2}$ CNT-nest-S cell at C/10 and C/3. The comparison of rate performance (FIG. 3B) and cycling performance (FIG. 3C) between CNT-S and CNT-nest-S cell, with sulfur loading 1.78 mgcm$^{-2}$.

The superior property of the ant nest structure can be demonstrated by electrochemical performance in FIGS. 3A-3C. The CNT-nest-S cells with the nest structure design show much improved performance compared to CNT-S (FIG. 1B) at both C/10 and C/3 and sulfur loading at 1.78 mgcm$^{-2}$ and 3.07 mgcm$^{-2}$. The two-plateau voltage profiles of CNT-nest-S cells of two loading are quiet similar both at C/10 and C/3, FIG. 3A. This indicates the CNT-nest-S structure enables good sulfur dissolution (from $S_8$ to $Li_2S_4$) and highly efficient precipitation (from $Li_2S_4$ to $Li_2S$) without channel blocking issue even at 3.07 mgcm$^{-2}$ loading and high rate discharge. Therefore, high sulfur utilization is achieved.

The comparison between the cells with (CNT-nest-S) and without (CNT-S) the nest structure can further demonstrate the good property of the ant nest structure. The CNT-nest-S electrode possesses superior rate performance and cycling performance over CNT-S, in FIG. 3B. With the same charge and discharge rate, the specific capacity for CNT-nest-S structure from C/10 to 1 C is quiet similar, and a capacity of 615 mAhg$^{-1}$ can still be obtained at 3 C. In contrast, less than half of the capacity is obtained higher than C/5 in regular CNT-S cell, and less than 200 mAhg$^{-1}$ can be obtained at 3 C. As a further indication of the property of CNT-nest-S structure, long-term cycling performance at C/3 is plotted in FIG. 2F. The stable cycling specific capacity of 1060 mAhg$^{-1}$ is achieved for the CNT-nest-S cell, but only 445 mAhg$^{-1}$ is achieve for CNT-S. These data gives strong evidence to the capability of the CNT-nest-S structure in facilitating high loading Li—S batteries and achieving superior rate and cycling performance.

FIG. 4A illustrates a schematic diagram of CNT-nest-S electrode structure with local magnification diagram illustrating the working mechanism of the nest structure in fully charged (FIG. 4B) and discharge state (FIG. 4C). (FIGS. 4D-4F) SEM images of the cross-section morphology of discharged CNT-nest-S electrode with 3 mgcm$^{-2}$ sulfur loading. The inset figure in (FIG. 4D) is the photo of the separator in CNT-nest-S cell.

The good performance of the CNT-nest-S Li—S cells stem from the unique property of the nest structure. The overview and local magnification diagrams of the CNT-nest-S in both fully charged and discharged state are shown in FIGS. 4A-4C to illustrate the working mechanism. The detailed mechanism study is performed on the 3 mgcm$^{-2}$ loading CNT-nest-S electrode structure with post mortem analysis in the fully discharge state to further prove the proposed mechanism, in FIGS. 4D-4F. Both CNT-nest-S and CNT-S cells are disassembled after two cycles at C/10 and discharge at C/3.

The property of the nest structure includes several key aspects: Firstly, the sustention of polysulfide is greatly enhanced by the porous structure with small openings. The storage space can well sustain the dissolved polysulfide in the porous structure, in FIG. 4D. This can keep the polysulfide from diffusing into the electrolyte and therefore greatly reduce the shuttle effect. Also, the affinity between the polysulfide and the functionalized binder can improve the storage efficiency. The clear color of electrolyte on the separator from the dissembled cell at fully discharged state can well prove this reduced effect, shown in inset of FIG. 4D, when comparing with the color of the electrolyte in the CNT-S cell shown in FIG. 1B. Secondly, the interconnected channels for ions transport are highly efficient in assisting ultrafast reaction dynamics. Numerous interconnected channels between porous structure are created spontaneously during the sacrificial fabrication process, penetrating all through the electrode, and remain unblocked after fast discharge in high loading Li—S cells, proved by the zoom-in cross-section SEM morphology in FIGS. 4D-4E. Therefore, the blocking issue in the high loading Li—S cells is successfully solved. Thirdly, the conductive binder can help to improve conductivity of the electrode, and the porous structure with the large surface area of CNT help to extend the reaction surface area. Therefore, an efficient precipitation of the sulfur species ($S_8/Li_2S$) is observed during charge and discharge process, demonstrated in FIGS. 4B and 4C, and is also proved by the clear electrolyte in inset of FIG. 4D. In all, an efficient Li—S electrode mimicking the beauty of ant nest structure is created, and demonstrated via the good performance of high loading Li—S cells.

Figure 8A:
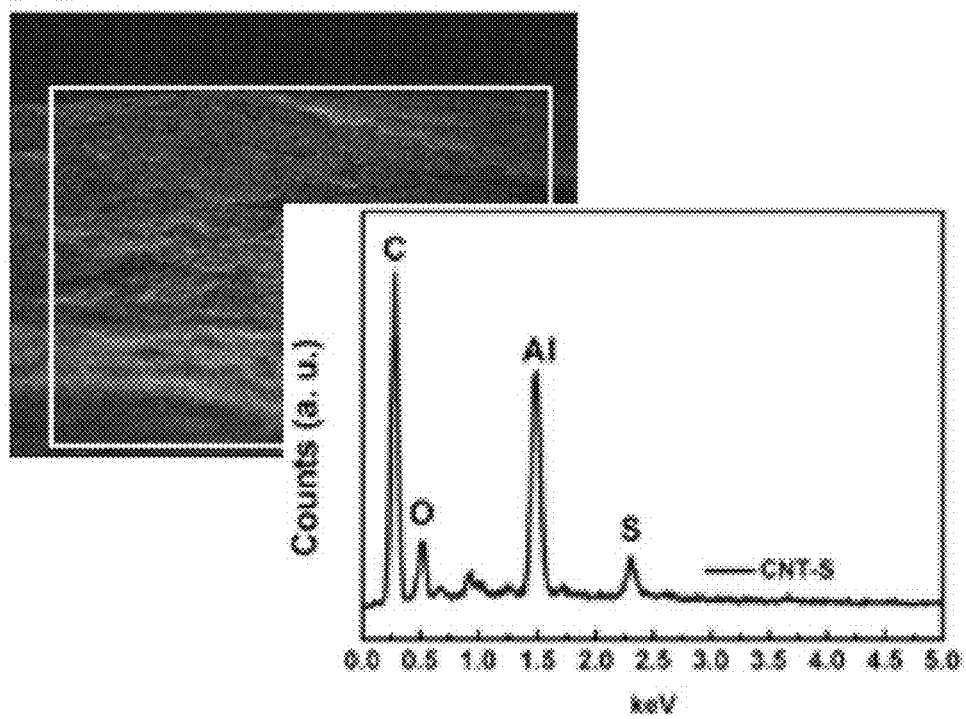
FIG. 8A illustrates EDX mapping of CNT-S fresh electrode. The EDX data is shown in the inset of (FIG. 8A) and (FIG. 8D).
Figure 8B:
FIG. 8B shows S mapping for CNT-S.
Figure 8C:
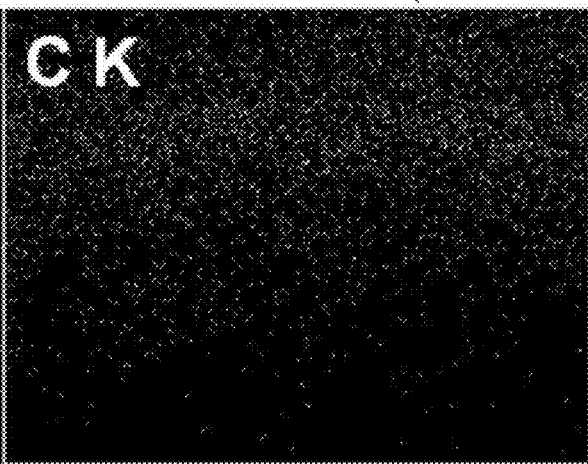
FIG. 8C shows C mapping for CNT-S.
Figure 8D:
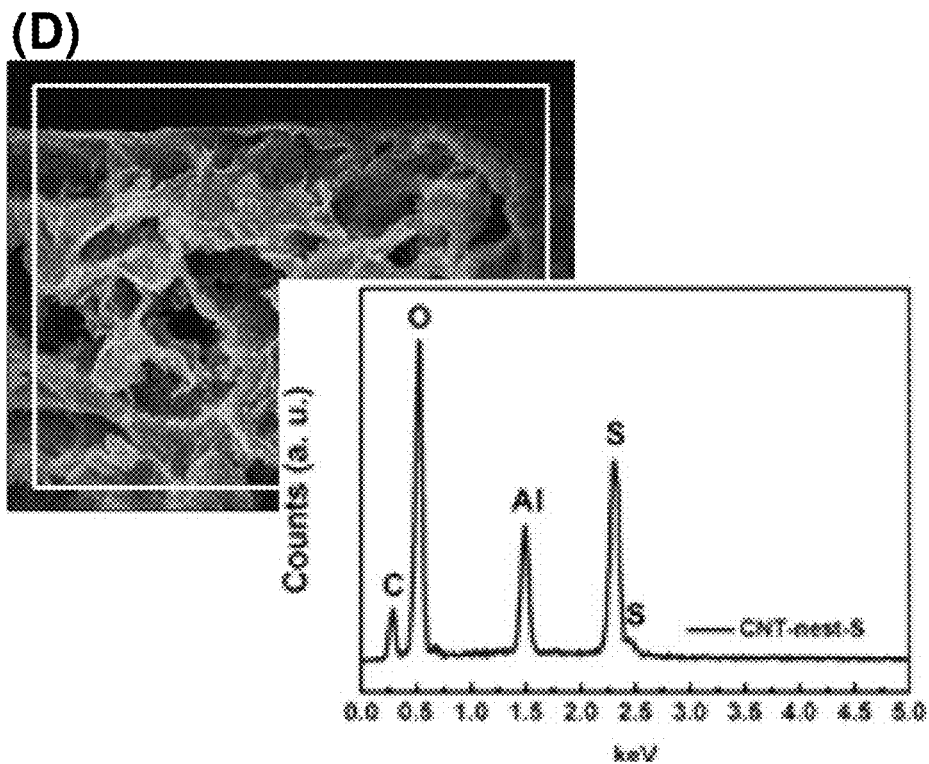
FIG. 8D shows the nest-structure CNT-nest-S electrode of the selected area.
Figures 8E, 8F:
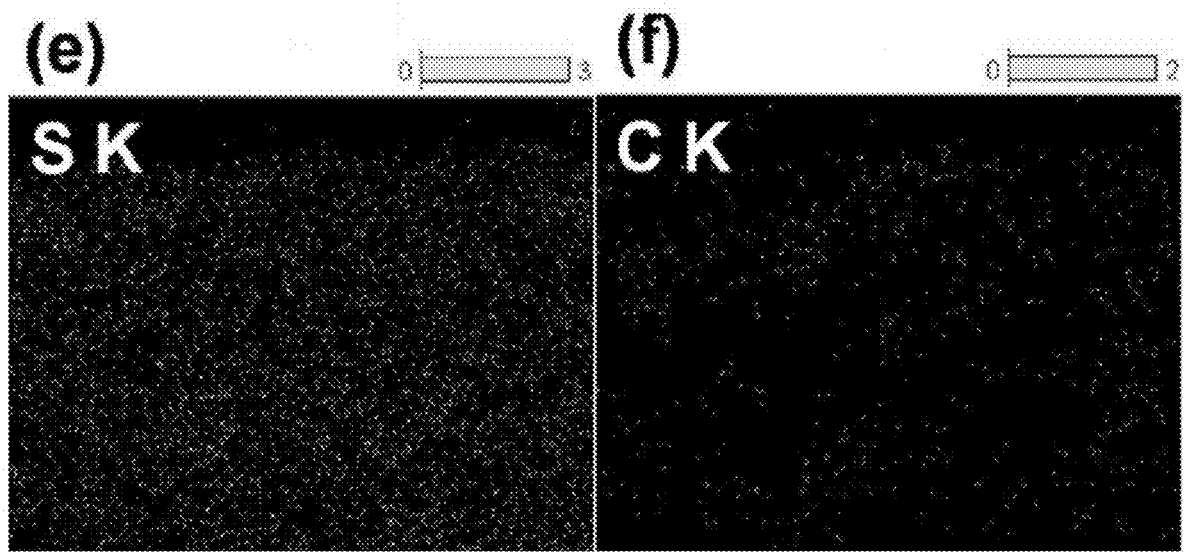
FIG. 8E shows S mapping for CNT-nest-S.
FIG. 8F shows C mapping for CNT-nest-S.

The characteristic of the ant-nest structure is further demonstrated via the detailed comparison between the CNTnest-S and regular CNT-S. When fast discharge is applied on the high loading CNT-S cells, the sulfur species precipitates on the surface of the electrode and block channels from further reaction, FIG. 1A inset. Large quantity of bare CNT network is observed in TEM with very small amount of observable $Li_2S$ precipitation, FIG. 10. While for CNT-nest-S, the edge of all surface is covered by $Li_2S$ precipitation with CNT network vigorously seen, and small random pores can be found, FIG. 10. This difference in sulfur distribution is also observed with and EDX mapping. Very few sulfur content and much carbon is detected in regular CNT-S electrode, FIG. 9, while a lot more sulfur content is detected all over the scan area in CNT-nest-S electrode, with less carbon detected, FIG. 9. A larger relative quantity of the sulfur content to carbon is observed in CNT-nest-S with EDX. In CNT-nest-S, the relative S to C ratio is 0.38, which is 19 times higher than the in regular CNT-S electrode, FIG. 8A.

Figure 9:
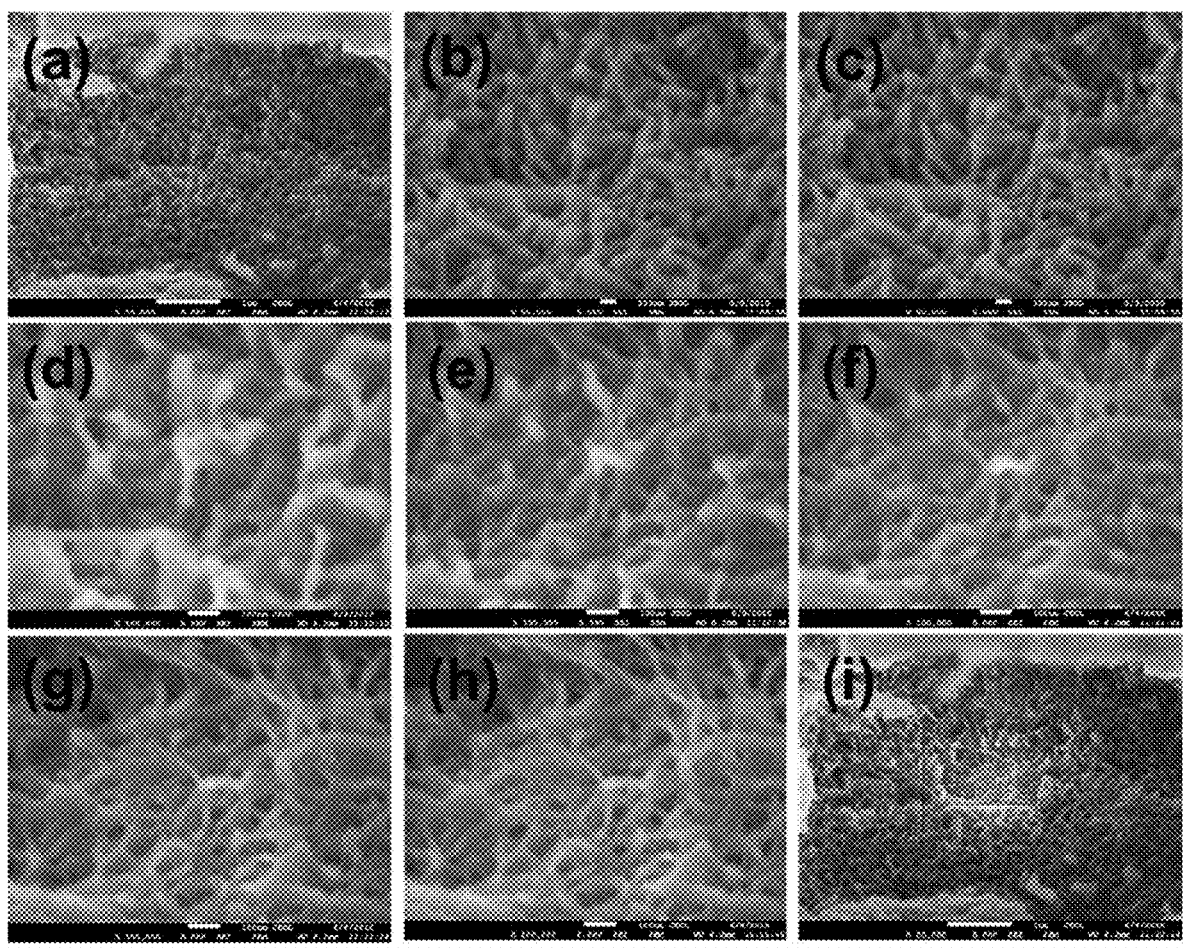
FIG. 9 illustrates SEM images taken continuously on the same spot.
Figure 10:
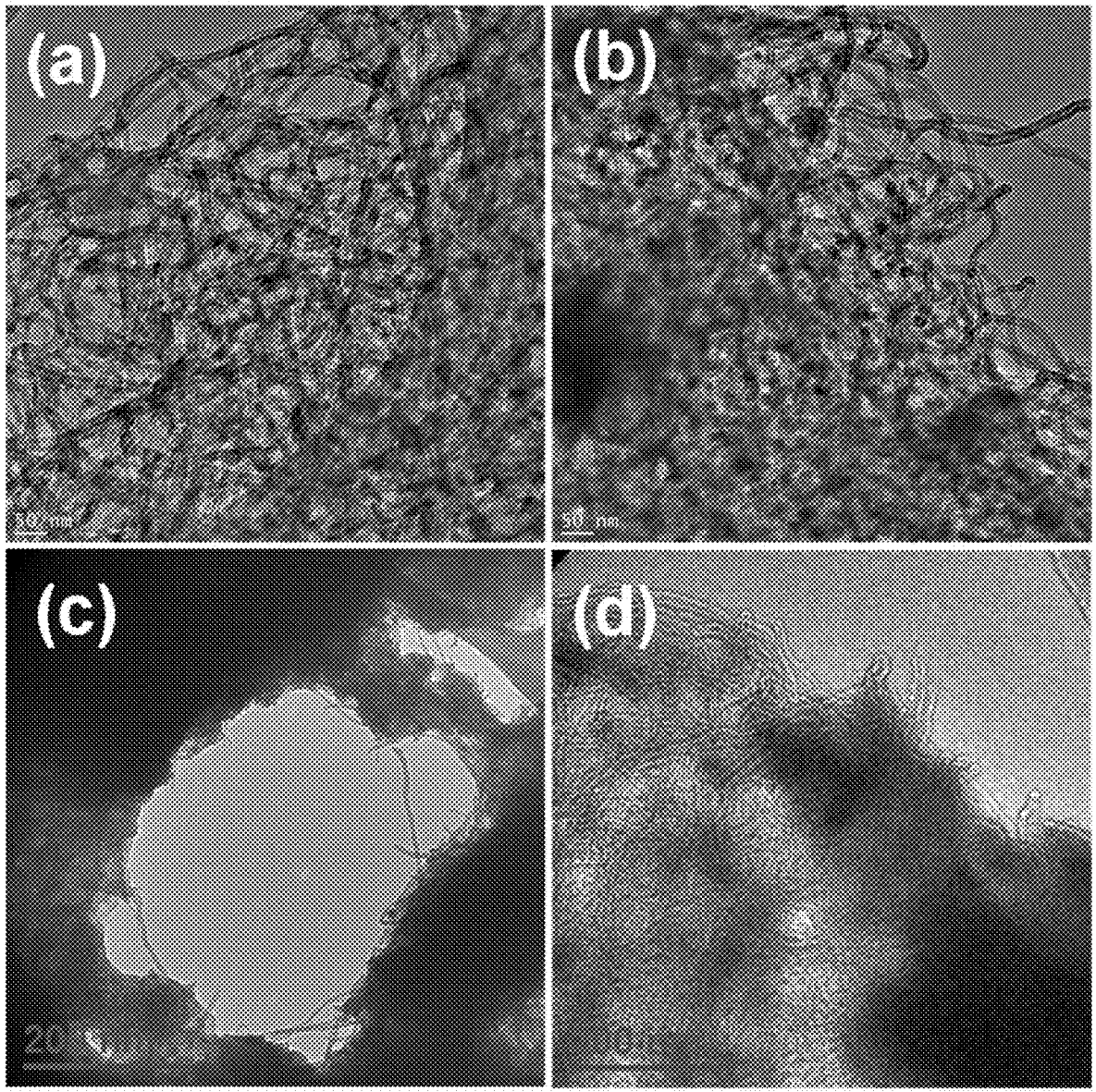
FIG. 10 illustrates TEM images of the regular CNT-S electrode and nest-structure CNT-nest-S electrode.

An interesting morphology of sulfur species is observed inside the micro-pores at fully discharged state in CNT-nest-S electrode. With high magnification SEM in FIG. 4F, all the inner walls inside the pores are covered by the needle-shaped structure, with smaller than 50 nm diameter and around 200 nm length. Since a large relative ratio of sulfur is observed by EDX, and a capacity of more than 900 $mAhcm^{-2}$ is obtained, the needle-shaped sulfur species can be assigned to be $Li_2S$ in this fully discharged state. Also it is interesting to notice that the needle structure is very sensitive to electron beam irradiation. FIG. 9 illustrates SEM images taken continuously on the same spot. The needle-shaped structure will gradually evaporate away after continuous expose to electron beam in SEM, and only bared CNT framework underlying needle-shaped structure the will be left. Although not thoroughly reported by other research work, we suspect that this needle-shaped structure can be assigned as $Li_2S$ nanowires grown on the CNT surface. Analogous to the nanowire growth in other systems, the needle-shaped structure are guessed to be the result of the surface tension, discontinuous crystal structure growth in initial atom layers and the subsequent precipitation. This can give further evidence to the positive effect of CNT-nest-S electrode in assisting polysulfide precipitation with the enlarged, high-conductive surface and unblocked ion transport pathway.

Figure 5A:
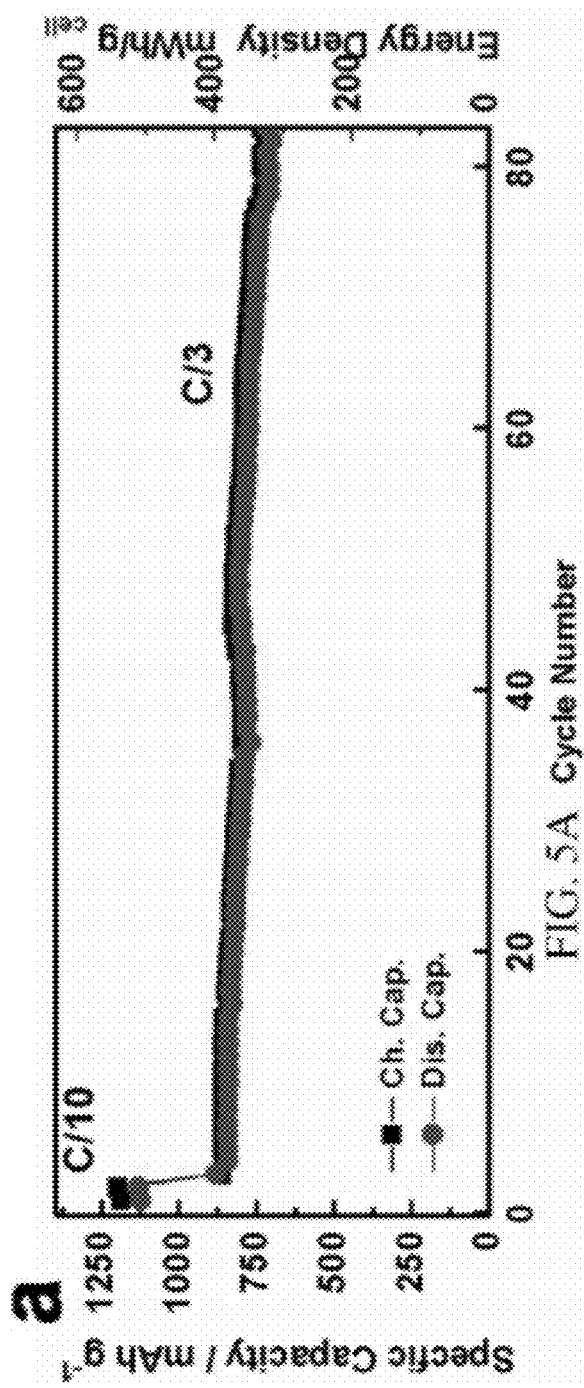
FIG. 5A illustrates cycling performance of the 80% S-nest-S cell with 2.52 mgcm$^{-2}$ sulfur loading, both the sulfur-level specific capacity (left scale) and the cell-level Energy Density (right scale) are included.
Figure 5B:
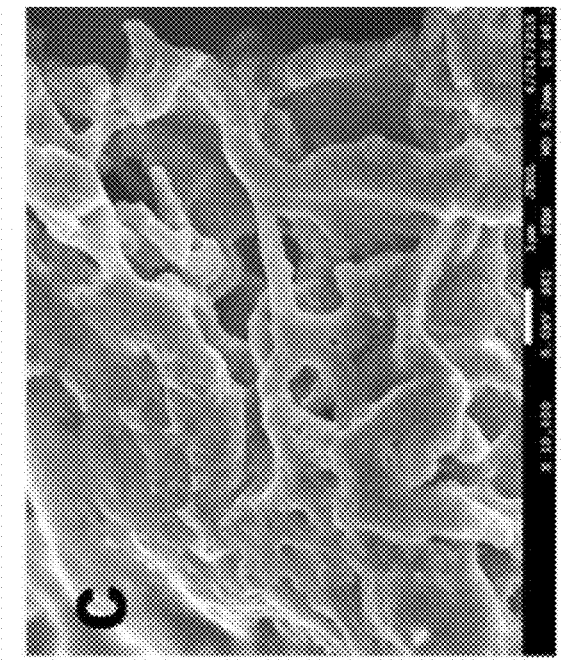
FIG. 5B shows a SEM image of cycled 80% S-nest-S electrodes cross section morphology.
Figure 5C:
FIG. 5C shows a SEM image of zoom-in morphology.
Figure 5D:
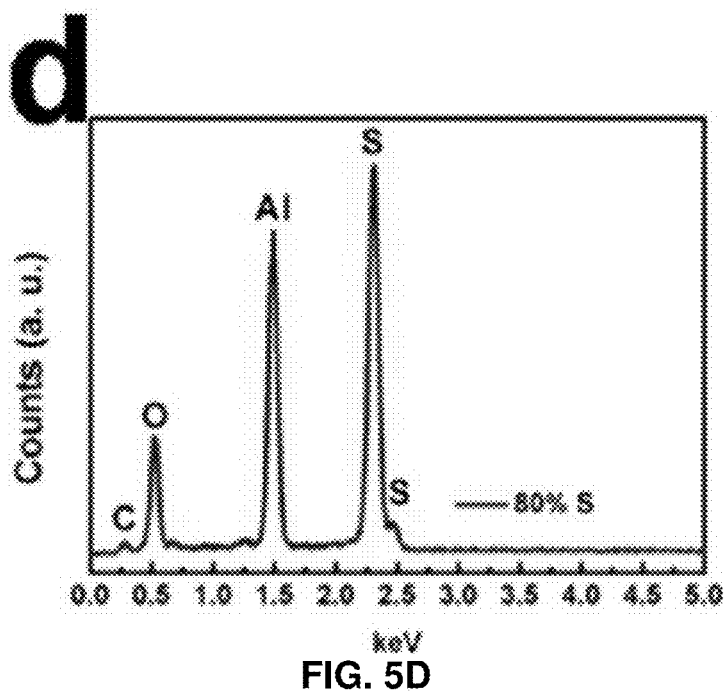
FIG. 5D shows EDX data for cycled 80% S-nest-S electrode corresponding to the area shown in FIG. 5B.

FIG. 5A illustrates cycling performance of the 80% S-nest-S cell with 2.52 $mgcm^{-2}$ sulfur loading, both the sulfur-level specific capacity (left scale) and the cell-level Energy Density (right scale) are included. SEM images of cycled 80% S-nest-S electrodes cross section morphology (FIG. 5B) and zoom-in morphology (FIG. 5C). EDX data (FIG. 5D) and EDX mappings (FIGS. 4E-4F) for cycled 80% S-nest-S electrode corresponding to the area shown in (FIG. 5B).

Another big challenge for world-wide Li—S researchers is the low sulfur ratio of Li—S electrode applied in current Li—S system, usually below 60 wt % (to total electrode mass). As discussed frequently in recent works, the high fraction of non-active material doesn't contribute to the capacity at all, and significantly lowers the energy density of Li—S battery, which is highly undesired. Although, several attempts have been made towards the higher sulfur ratio electrode, the improvement is not very satisfaction[ref]. With the design of the novel nest structure electrode proposed in this work, its unique property can not only be demonstrated via the good cycling and rate performance on high-loading Li—S batteries, its potential can be further achieved in ultra-high sulfur ratio (up to 85 wt %) application.

Figure 11:
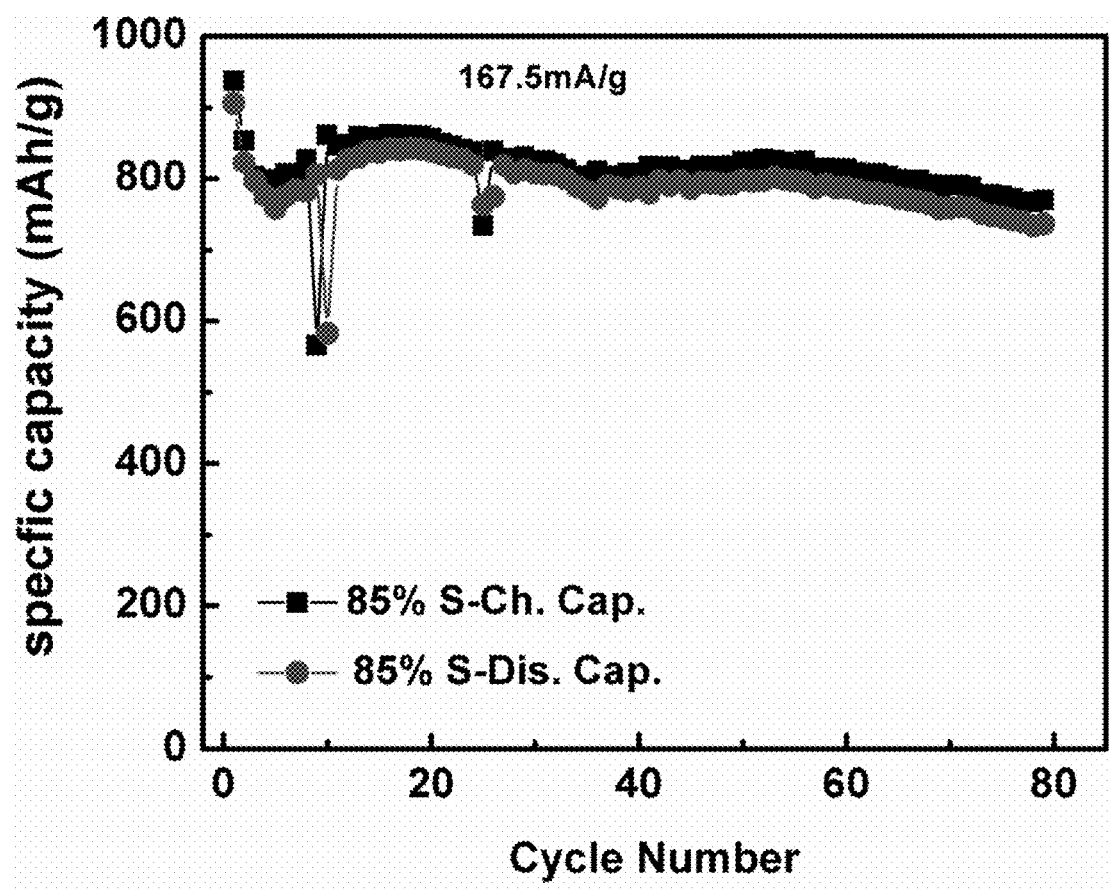
FIG. 11 illustrates cycling performance of the 85S-CNT-nest-S electrode with 2.65 mg/cm$^2$ sulfur and 85% sulfur ratio in the electrode.

The property of the nest structure in achieving ultra-high sulfur ratio Li—S batteries is firstly demonstrated via 80 wt % sulfur in composite electrode (named 80% S-nest-S), which is composed solely of 80 wt % sulfur, 5 wt % binder, and 15 wt % CNT, and all cells have sulfur loading ranging from 2.5 mg $cm^{-2}$ to 3 mg $cm^{-2}$. The cycling performance is plotted in FIG. 5A. High capacity of 1123.5 $mAhg^{-1}$ is achieved at C/10 (167 $mAg^{-1}$) and 908.5 $mAhg^{-1}$ is obtained at C/3 (558 $mAg^{-1}$) for the 80% S-nest-S cell. Its energy density based on cell level calculation is also plotted on the right scale of FIG. 5A. The mass of each cell component for the energy density calculation are listed in Table 1. When all the mass from the cell is calculated, the energy density of the 80% S-nest-S cell is 509 $mWhg^{-1}$ at C/10 and 374 mWh $g^{-1}$ at C/3. It has achieved the 2.8 and 2 times of the state-of-the-art Li-ion batteries (180 Wh $kg^{-1}$). This value is attractive when compared to any other recent work. What's more, a high capacity of ~937 $mAhg^{-1}$ can be achieved at C/10 (167 $mAg^{-1}$) for the 85% S-nest-S cell (85 wt % sulfur, 3 wt % binder, and 12 wt % CNT), with stable performance of 800 $mAhg^{-1}$ over 80 cycles, shown in FIG. 11. In this way, we can make full utilization of the ant-nest structure and increase the sulfur loading at the same time with significant decrease in the ratio of the non-active material.

TABLE 1

The mass of each cell component for the energy density calculation

| component | Mass in calculation (mg/cm$^2$) |
|---|---|
| Cu | 4.5 |
| Li | Calculated from the sulfur loading |
| Electrolyte + separator | 5 |
| sulfur | Different according to each cell |
| Al | 1.4 |

Figure 5E:
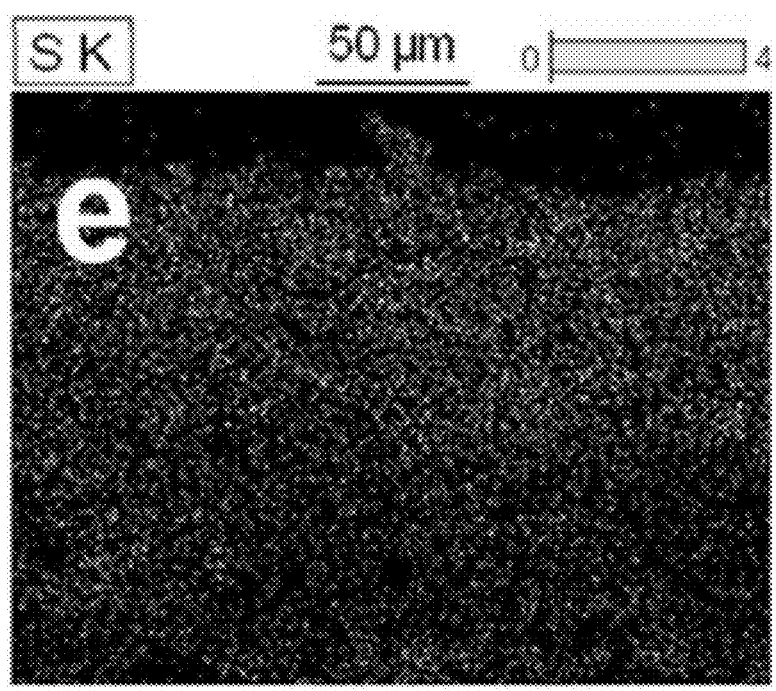
FIG. 5E shows an EDX mapping.
Figure 5F:
FIG. 5F shows another EDX mapping.

To get an insightful mechanism understanding of the ant nest structure with high sulfur loading and high sulfur ratio, the post mortem analysis for cycled cell is performed with 80% S-nest-S after two cycles at C/10 and discharge at C/3. Cross-section morphology of the 80% S-nest-S cell is observed through SEM in FIGS. 5B-5C. The ant nest structure remains with large pores and un-blocked interconnected channels. Very thick $Li_2S$ precipitation layer is observed coating on the surface of CNT network. This indicates that with the assist of high conductive CNT network and conductive binder, the reaction surface is highly efficient for resistive $Li_2S$ precipitation. Also, the numerous porous structures can provide enough space for large quantity of polysulfide storage and large surface for efficient precipitation. Despite noticeable shrinkage of the interconnected channels is observed, they mostly remain open after the fast discharge, therefore the fast ion transport can be ensured in high loading Li—S cells. Further evidence of the superior capability in sulfur species ($Li_2S$) precipitation is given via EDX, FIGS. 5D-5F. A high relative sulfur content to carbon (S to C ratio: 1.88) is observed, which is the 94 times of the regular CNT-S and 5 times of the 50%-CNT-nest-S. EDX mapping further demonstrates the high sulfur composition ratio and full-coverage in the porous structure. The 80% S-nest-S is all covered by sulfur species ($Li_2S$) with CNT frame work buried beneath; large quantity of sulfur signal and carbon signal can hardly been detected, FIGS. 5E-5F.

In this way, the unique property of the ant nest structure is clearly demonstrated via the hosting of ultra high sulfur ratio in high loading Li—S batteries. The design idea of the ant nest structure has been fulfilled: with large storage area and functionality to attract and sustain polysulfide, the multi interconnected channels to assist fast ion transportation, and the high conductive CNT and conductive binder to ensure the good conductivity of the entire electrode. Further efforts need to be addressed in the over-all cell optimization.

The conductive additive used in the lithium sulfur electrode may be carbon nanotubes, and may also include carbon black, graphene, carbon fiber or the mixture of any of these additives. NaCl is used as a template agent when the slurry is made with organic solvent, and later extracted out by washing with water. However, if a water soluble binder and water are used for making slurry, other template materials may be used, such as polystyrene (polyethylene, propylene) fiber or beads, which can be reversibly extracted by an organic solvent such as toluene or xylene.

Additional binders for the sulfur electrode may include binder poly(vinylbenzyl chloride)-co-poly(vinylbenzyl trimethylammonium chloride) (PVBNC) used for sulfur electrode.

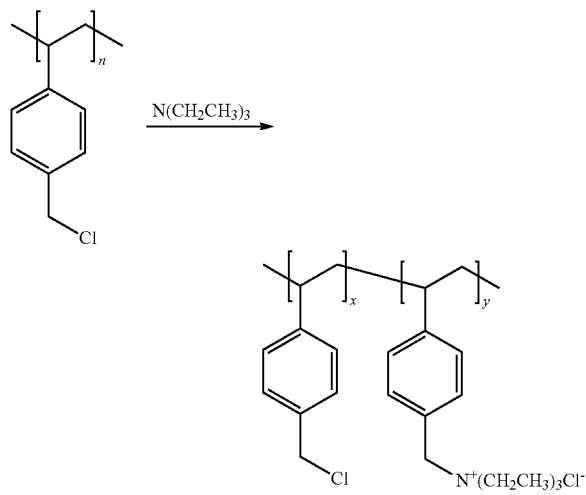

Conclusion

In this work, a novel electrode structure is proposed for the application of high loading Li—S batteries. It takes the inspiration from nature ant-nest structure, which is famous for the large area storage capability and highly efficient, interconnected transportation pass way design. The nest structure for Li—S electrode is composed of the most conductive CNT frame work and the conductive binder to achieve good conductivity for the reaction of insulating sulfur active material. It is fabricated through common electrode fabrication method with cheap house-hold salt as sacrificial additive. The ant nest structure has demonstrated excellent capability in high loading Li—S batteries with electrochemical performance and post mortem analysis: The polysulfide are well preserved in the large storage area assisted by the functionality of the functional binder; fast electron and ionic transport are ensured by the multi interconnected channels with the channel blocking issue prohibited via the large extended reaction surface and multi interconnected channels distributed all through the electrode structure; also a good electronic conductivity all through the electrode can be ensured with the high conductive CNT network and the conductive binder.

What's more, greater opportunity for this nest structure electrode lies in the high accommodate capability of sulfur up to 85 wt % ratio, combined only by 12 wt % CNT and 3 wt % binder, which can achieve the same composition of active material as the commercial NMC cathode. A high loading Li—S electrode with good cycling and rate performance is achieved. The cell-level energy density for the Li—S battery with novel structure design can reach 2-2.8 times of the energy density of the commercial Li-ion battery. With the detailed mechanism study, we found that a thick $Li_2S$ layer precipitation is achieved in the high sulfur ratio electrode. This indicates that the full recover of the active material can be assisted by the well-designed functional nest structure, with good storage capability, fast ion transport pathway and high conductivity of the electrode. Further effort should be made to optimize the nest structure along with the overall development of electrolyte, protection of Li metal surface and cell design to match the high loading Li—S batteries.

Material and Methods

1 Materials

The sulfur powder is purchased from US Research Nanomaterials, Inc. CNT and NaCl is purchased from Sigma-Aldrich Inc. poly(9,9-dioctylfluorene-co-fluorenone-co-methylbenzoic ester)(PFM) is synthesized according to previous work. The chlorobenzene (Sigma-Aldrich Inc.) is used as the solvent for PFM. The electrolyte for cell testing is composed of 1M lithium salt bis(trifluoromethanesulfonyl)imide (LiTFSI) dissolved in 1,3-dioxolane/1,2-dimethoxyethane/(n-methyl-(n-butyl) pyrrolidiniumbis(trifluoromethanesulfonyl)imide DOL/DME/PyR14TSFI (3:3:2 in volume), and 1 wt % LiNO3 $LiNO_3$, all purchase from Sigma-Aldrich.

2 Cathode Fabrication

The PFM is dissolved in chlorobenzene at 5 wt % ratio. Sulfur powder and CNT are added into the binder-solvent solution after the binder is dissolved. For the regular electrode, the weight ratio of these three components is: 50% sulfur, 10% PFM, 40% CNT. The NaCl particles are firstly ball-milled into micro sized particle then added to the slurry for the nest structure electrode. The composition of the nest structure electrode is 50% sulfur, 10% PFM, 40% CNT for 50% S electrode; 80% sulfur, 4% PFM, 16% CNT for 80% S electrode; and 85% sulfur, 3% PFM, 12% CNT for 85% S electrode. The mixture is mixed by ball-milling method for overnight to obtain uniform slurry. The laminate is then made by coating the slurry on a 30-μm-thick battery-grade nickel current collector with a Mitutoyo doctor blade and an Elcometer motorized film applicator. Mass loading of sulfur is 1.5-3 mg $cm^{-2}$. After the laminate is fully dried, it is further dried in a vacuum oven at 50° C. overnight.

3 Cell Assembly and Testing

Li—S batteries are tested with 2325-type coin cells (National Research Council Canada). The cells are assembled in an argon-filled glove box with oxygen content less than 0.1 ppm. The size of the sulfur electrode is ½-inch OD, and the size of the counter electrode lithium metal disk is ¹¹⁄₁₆-inch OD. The Li foil is purchased from FMC-Lithium Co. The separator used is polypropylene film (Celgar 2400). Galvanostatic cycling tests are performed on a Maccor series 4000 cell tester (Maccor, Inc., Tulsa, Okla.). The voltage window for cell test is 1.7-2.7 V. The cells are cycled at C/10 for 2 cycles before any other test.

4 Material Characterization Techniques

Morphology of the electrode surface is characterized with a JSM-7500F scanning electron microscope at the National Center for Electron Microscopy (NCEM) at Lawrence Berkeley National Laboratory. An energy dispersive X-ray (EDX) spectrometer attached to the SEM (JEOL JSM-7500F) was used to conduct elemental analysis of sulfur and the distribution with an accelerating voltage of 15 kV. Transmission Electron Microscopy (TEM) images was produced by a 200 kilovolt FEI monochromated F20 UT Tecnai. Thermo gravimetric analysis (TGA, TA Instruments Q5000) was used to determine the ratio of the S in the electrode using a heating rate of 10° C./min in $N_2$. The cycled Li—S batteries are opened with a cell opener for post-test analysis, and the electrode is washed thoroughly with DOL/DME with a volume ratio of 1:1 inside an argon-filled glove box.

What is claimed is:

1. A composition of matter comprising:
    a nanocomposite comprising poly(9,9-dioctylfluorene-co-fluorenone-co-methylbenzoic ester)(PFM), carbon nanotubes (CNT), and sulfur particles, wherein the nanocomposite is porous with an ant nest network comprising storage spaces interconnected with multiple channels between the storage spaces.

2. An electrode comprising:
    a nanocomposite comprising poly(9,9-dioctylfluorene-co-fluorenone-co-methylbenzoic ester)(PFM), carbon nanotubes (CNT), and sulfur particles, wherein the nanocomposite is porous with an ant nest network comprising storage spaces interconnected with multiple channels between the storage spaces.

3. The electrode of claim 2, further comprising a metal current collector with a porous laminate thereon, the porous laminate further comprising the nanocomposite, wherein the nanocomposite is porous.

4. A lithium sulfur (Li—S) battery comprising:
    an electrode comprising a nanocomposite comprising poly(9,9-dioctylfluorene-co-fluorenone-co-methylbenzoic ester)(PFM), carbon nanotubes (CNT), and sulfur particles nanocomposite, wherein the nanocomposite is porous with an ant nest network comprising storage spaces interconnected with multiple channels between the storage spaces.

5. The Li—S battery of claim 4, wherein the electrode further comprising a metal current collector with a porous laminate thereon, the porous laminate further comprising the nanocomposite, wherein the nanocomposite is porous.

6. The Li—S battery of claim 5, further comprising an electrolyte.

7. The Li—S battery of claim 6, wherein the electrolyte is an ionic liquid-based electrolyte.

* * * * *